United States Patent [19]

Roberts

[11] 3,823,436

[45] July 16, 1974

[54] WIPER BLADE MOUNT

[75] Inventor: Harry W. Roberts, Merrick, N.Y.

[73] Assignee: Pylon Manufacturing Corporation, Ft. Lauderdale, Fla.

[22] Filed: Mar. 21, 1973

[21] Appl. No.: 343,496

[52] U.S. Cl. .......................................... 15/250.32
[51] Int. Cl. ............................................. B60s 1/40
[58] Field of Search....... 15/250.31, 250.32, 250.33, 15/250.34, 250.42

[56] References Cited
UNITED STATES PATENTS

| | | | |
|---|---|---|---|
| 2,432,693 | 12/1947 | Anderson | 15/250.32 |
| 2,548,090 | 4/1951 | Anderson | 15/250.32 |
| 2,616,112 | 11/1952 | Smulski | 15/250.32 |
| 3,641,614 | 2/1972 | Newsome | 15/250.32 |

*Primary Examiner*—Peter Feldman
*Attorney, Agent, or Firm*—Molinare, Allegretti, Newitt & Witcoff

[57] ABSTRACT

A mount for coupling a wiper blade to a movable arm of a windshield wiper system. The mount includes a yoke that is fitted with a slot which makes an acute angle with the upper edge of the yoke. A carriage having two lip members is rotatably mounted inside the yoke. The carriage receives the pin in an open position through the upper edge of the yoke and moves the pin into an inserted position in which the pin is locked in the yoke. An over-center biasing spring biases the carriage in the open position for enabling insertion of the pin and biases the carriage in a closed position in which the pin is locked to the yoke.

10 Claims, 8 Drawing Figures

PATENTED JUL 16 1974 3,823,436
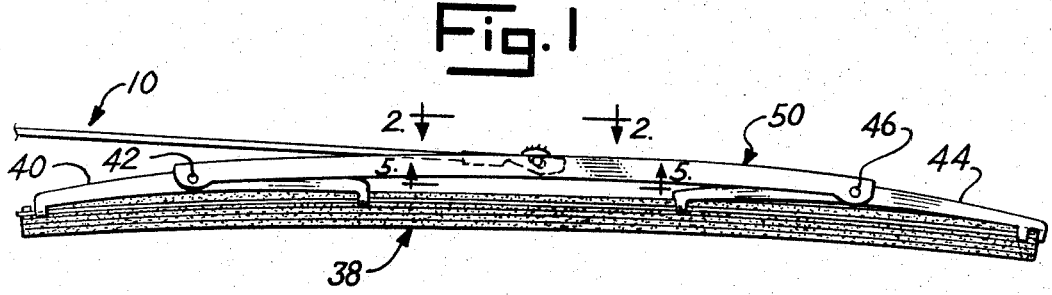
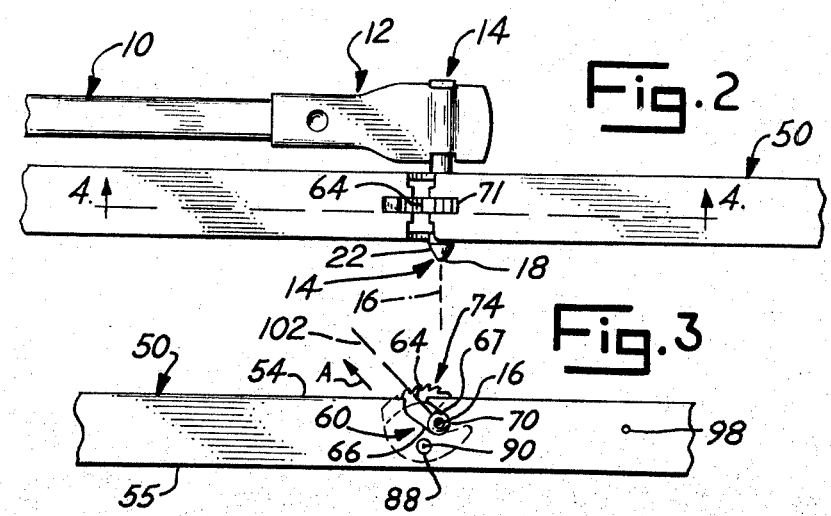
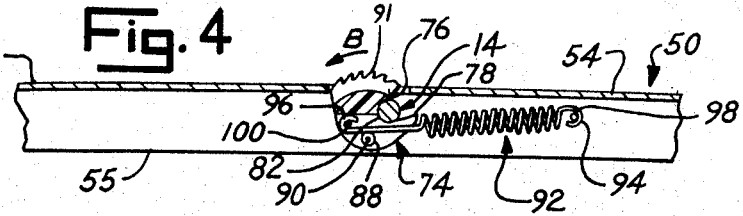
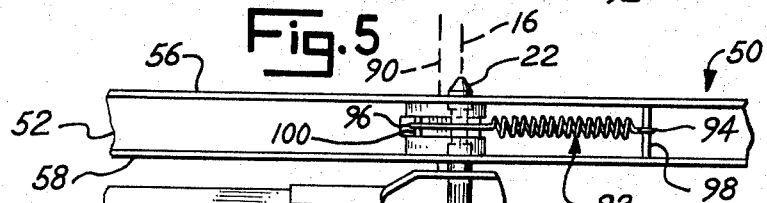
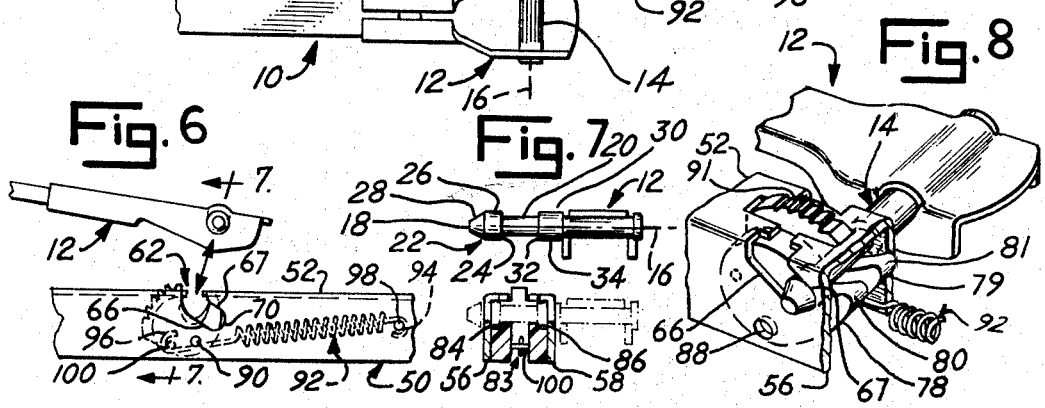

WIPER BLADE MOUNT

BACKGROUND AND SUMMARY OF THE INVENTION

This invention relates to windshield wiper blade mounts and more particularly relates to improved apparatus for releasably mounting the pin of a wiper arm to the yoke of a windshield wiper blade assembly.

A typical windshield wiper blade assembly includes a wiper blade, a flexible backing strip for mounting the blade, and a yoke for holding the blade and backing strip in position while the blade is moved over the windshield by an oscillating wiper arm. A typical oscillating wiper arm presently available on vehicles manufactured in the United States includes a pin which projects cantilever fashion from a side of the arm into a opening accessible from the side of the yoke in order to mount a wiper blade assembly in a side-by-side relationship to the arm. The pin generally comprises a recess located between an outer shoulder and an inner shoulder. A spring member engages in the recess to hold the pin and yoke in assembled relationship. In order to replace a used wiper blade assembly, the yoke of the used assembly must be removed from the pin, and the yoke of a new assembly installed on the pin. In many cases, the replacement is performed at a gas station, or similar locale, under poor lighting conditions and adverse environmental conditions, such as during rain and snow storms. It is sometimes difficult to align the pin with the opening in the yoke since the diameter of the pin is only slightly less than the diameter of the hole. Further problems are encountered during inclement weather for the hole can be clogged by foreign matter or ice and the pin cannot be inserted until the hole is cleaned. There is need for a quick, foolproof, and secure arrangement for releasably coupling the wiper blade assembly to the pin on the arm.

As a result, it is an object of the present invention to provide improved means for releasably coupling a wiper blade assembly to the pin of a wiper arm without fitting the pin transversely through a hole in the assembly.

Another object of the present invention is to provide improved coupling apparatus by which the pin of a wiper arm can be inserted through the top edge of the yoke of a wiper blade assembly in order to simplify replacement of the assembly.

Yet another object of the present invention is to provide improved coupling apparatus in which the pin of a wiper arm can be inserted into a slot in the yoke of a wiper assembly at an acute angle so that the pin is securely locked in the yoke.

It is still another object of the present invention to provide improved coupling apparatus of the foregoing type in which a carriage rotatably mounted on the yoke is biased in an open position which allows insertion of the pin and is biased in a closed position which facilitates locking of the pin.

BRIEF DESCRIPTION OF THE DRAWING

These and other objects, advantages and features of the present invention will appear in connection with the accompanying drawing which shows a preferred embodiment of the invention and wherein:

FIG. 1 is a front elevational view of an exemplary wiper arm and wiper blade assembly illustrated with a yoke embodying a preferred embodiment of the present invention;

FIG. 2 is an enlarged, top plan, fragmentary view taken along line 2—2 of FIG. 1;

FIG. 3 is a front elevational view of the apparatus shown in FIG. 2 wherein a carriage mounted inside the yoke is shown in its closed position with the spring being omitted for clarity of illustration;

FIG. 4 is a cross-sectional view taken substantially along line 4—4 in FIG. 2;

FIG. 5 is a bottom plan view of the apparatus taken along line 5—5 in FIG. 1;

FIG. 6 is a front elevational view of the apparatus shown in FIG. 3 in which a carriage mounted inside the yoke is moved to its open position and in which the wiper arm is positioned above the yoke in preparation for insertion;

FIG. 7 is a cross-sectional view taken along line 7—7 in FIG. 6; and

FIG. 8 is an enlarged, isometric, fragmentary view of the apparatus shown in FIG. 2.

DETAILED DESCRIPTION OF THE PREFERRED EMBODIMENT

Referring to the drawing, the preferred embodiment is adapted for use in connection with a wiper arm 10 that is rotated by a motor (not shown) over an area of a windshield of a motor vehicle. An end mount 12 is fitted on the free end of the wiper arm so that it supports a pin 14 having a longitudinal axis 16 and an end point 18. The pin has a cylindrical recess 20 (FIG. 7) that is positioned between an outer shoulder 22 and an inner shoulder 30. The outer shoulder comprises an inner edge 24, a cylindrical outer surface 26 and a beveled conical surface 28. Inner shoulder 30 comprises an inner edge 32 and a cylindrical outer surface 34.

The preferred embodiment can be used with a conventional windshield wiper blade 38 that is supported by a lever 40 rotatably mounted on a pin 42 and by a lever 44 rotatably mounted on a pin 46. Pins 42 and 46 are connected to a yoke 50 in order to couple the wiper blade to the yoke.

According to a preferred practice of the invention, yoke 50 comprises a flat, metal upper member 52 having an upper surface that defines an upper edge 54. Metal sidewalls 56 and 58 are perpendicular to and integrally formed with member 52. The free ends of sidewalls 56 and 58 define a lower edge 55 of the yoke.

A slot 60 is fabricated in the yoke so that it defines an opening 62 which extends through upper member 52. The opening has a center point 64. Sidewall 56 is fabricated with parallel side edges 66 and 67, and sidewall 58 is fabricated with like parallel edges in order to define a portion of slot 60. Slot 60 terminates in a lower surface 70 located in sidewall 56 and a like, parallel lower surface located in sidewall 58. A slot 71 is cut traverse to opening 62 in member 52.

A plastic carriage 74 is mounted inside yoke 50 in the manner shown. The carriage comprises an upper lip member 76 and lower lip members 78, 79 (FIGS. 4 and 8) having outer edges 80 and 81, respectively. The lip members are joined by central surface 82 that is adapted to comate with recess 20 of pin 14. (FIG. 4.) Lower lip members 78 and 79 are divided by a slot 83 (FIG. 7). Carriage 74 also comprises recesses 84 and 86 (FIG. 7) that are adapted to comate with outer shoulder 22 and inner shoulder 30, respectively, to prevent pin 14 from moving in a direction parallel to longitudinal axis 16. Carriage 74 is rotatably mounted to yoke 50 by means of a pin 88 connected to sidewall 56 and a like, opposed, colinear pin located in sidewall 58. The pins define an axis of rotation 90 for the carriage. Carriage 74 also includes an arcuate, serrated, thumb wheel 91 that extends above upper member 52 as shown in FIGS. 3 and 4.

Carriage 74 is biased by a coil spring 92 having end hooks 94 and 96. End hook 94 is connected to a bar 98 that is mounted in sidewalls 56 and 58 in the position shown. End hook 96 is connected to a bar 100 that is mounted to the carriage in the position shown. As shown in FIG. 5, the spring is arranged so that it extends into slot 83.

FIGS. 2 and 3 show the pin in its inserted position in which upper lip 76 closes opening 62 so that the pin is locked to the yoke. As shown in FIG. 3, when the pin is in the inserted position, a plane 102 passing through center point 64 and longitudinal axis 16 makes an acute angle with upper edge 54. As shown in FIG. 4, when the pin is in the inserted position, a line drawn between bars 98 and 100 passes above axis of rotation 90 so that the coil spring 92 biases carriage 74 into its closed position shown in FIGS. 2–4.

In order to remove pin 14 from yoke 50, the pin is merely moved in the direction of arrow A (FIG. 3) parallel to plane 102, so that carriage 74 is rotated counterclockwise in the direction of arrow B (FIG. 4). Carriage 74 continues to rotate until it reaches its open position shown in FIG. 6 in which outer edges 80 and 81 of lip members 78 and 79 are biased against upper member 52. It should be noted that when carriage 74 is in the open position, a line drawn between bars 98 and 100 falls below axis of rotation 90 so that spring 92 biases the carriage into the open position. Spring 92 urges the carriage 74 from one over center position to another, that is, from an open position as seen in FIG. 6 to a closed position as seen in FIG. 7, and vice versa.

In order to insert the pin into the yoke, the pin is lowered through opening 62 until it makes contact with lip members 78 and 79. The pin is then pushed in a direction opposite arrow A so that the carriage is rotated in a clockwise direction opposite arrow B until it assumes the closed position shown in FIGS. 2–4.

By using the unique arrangement of components described herein, the pin may be inserted and withdrawn from the yoke with a degree of reliability and convenience previously unavailable.

While there has been described a presently preferred form of the invention, it will be understood by those skilled in the art that the invention is not limited thereto since it may be otherwise embodied within the scope of the following claims.

For example, the yoke may be fabricated from plastic rather than metal, and the carriage may be fabricated from a solid material other than plastic.

What is claimed is:

1. In a windshield wiper system including an arm adapted to move a wiper blade over a windshield and including a pin having a longitudinal axis extending from the arm to an outer end, said pin having a recess located between an outer shoulder and an inner shoulder, improved apparatus for releasably coupling the wiper blade to the pin comprising in combination:

a yoke having an upper edge and lower edge;
means for coupling the wiper blade to the yoke;
slot means for defining in the yoke a slot having an opening extending through the upper edge so that the pin can be moved through the upper edge into the slot;
a carriage mounted on the yoke for rotation around an axis of rotation located between the upper edge and the lower edge of the yoke;
a lip member connected to the carriage, said lip member being rotatable with the carriage into an open position in which the lip member is located substantially outside the slot so that the pin can be inserted into the slot from above the yoke and being rotatable with the carriage into a closed position in which the lip member extends into the slot adjacent the upper edge so that the pin is locked in the slot in an inserted position;
means for engaging at least one of said shoulders of the pin when the carriage is in at least the closed position for preventing the yoke from moving toward the outer end of the pin;
resilient means having a first end and a second end for creating a force acting between the first end and second end;
first means for attaching the first end of the resilient means to the yoke; and
second means for attaching the second end of the resilient means to the carriage so that a line connecting the first means and the second means passes through the axis of rotation as the carriage is rotated from the open position to the closed position, whereby the carriage is biased toward the open position when the line is located on a first side of the axis of rotation and the carriage is biased toward the closed position when the line is located on a second side of the axis of rotation.

2. Apparatus, as claimed in claim 1, wherein the carriage comprises a second lip member adapted to receive the pin when the carriage is in the open position, said second lip member being arranged so that the movement of the pin into the slot and against the second lip member rotates the carriage to the closed position.

3. Apparatus, as claimed in claim 1, wherein the opening of the slot defines a center point and wherein the slot means is shaped so that a plane passing through the center point and the longitudinal axis of the pin when the pin is in the inserted position makes an acute angle with the upper edge of the yoke.

4. Apparatus, as claimed in claim 2, wherein the means for engaging comprises:

a central curved surface joining the first lip member and the second lip member and adapted to comate with the recess of the pin;
a first carriage recess located on a first side of the central curved surface and adapted to receive the outer shoulder of the pin; and
a second carriage recess located on a second side of the central curved surface opposite the first side and adapted to receive the inner shoulder of the pin, whereby the pin is prevented from moving when it is located in the inserted position.

5. Apparatus, as claimed in claim 1, wherein the resilient means comprises a coil spring.

6. In a windshield wiper system including an arm adapted to move a wiper blade over the windshield and a pin having a longitudinal axis extending from the arm to an outer end, said pin having a recess located between an outer shoulder and an inner shoulder, improved apparatus for releasably coupling the wiper blade to the pin comprising in combination:

a yoke having an upper edge and a lower edge;

means for coupling the wiper blade to the yoke;

slot means for defining in the yoke a slot having a lower surface adapted to limit the travel of the pin toward the lower edge of the yoke when the pin is in an inserted position in the slot and for defining an opening of the slot having a center point and extending through the upper edge so that the pin can be moved through the upper edge into the slot, said slot means being arranged so that a plane passing through the center point and the longitudinal axis of the pin when the pin is located in the inserted position makes an acute angle with the upper edge;

a carriage mounted on the yoke for rotation around an axis of rotation located between the upper edge and the lower edge of the yoke;

a lip member connected to the carriage, said lip member being rotatable with the carriage into an open position in which the lip member is located substantially outside the slot so that the pin can be inserted into the slot and being rotatable with the carriage into a closed position in which the lip member extends into the slot adjacent the upper edge so that the pin is locked in the slot in the inserted position; and means for engaging at least one of said shoulders of the pin when the carriage is at least in the closed position for preventing the yoke from moving toward the outer end of the pin.

7. Apparatus, as claimed in claim 6, and further comprising resilient means having a first end and a second end for creating a force acting between the first end and the second end;

first means for attaching the first end of the resilient means to the yoke; and second means for attaching the second end of the resilient means to the carriage so that a line connecting the first means and the second means passes through the axis of rotation as the carriage is rotated from the open position to the closed position, whereby the carriage is biased toward the open position when the line is located on a first side of the axis of rotation and the carriage is biased toward the closed position when the line is located on a second side of the axis of rotation.

8. Apparatus, as claimed in claim 6, wherein the carriage comprises a second lip member adapted to receive the pin when the carriage is in the open position, said second lip member being arranged so that the movement of the pin into the slot and against the second lip member rotates the carriage to the closed position.

9. Apparatus, as claimed in claim 8, wherein the means for engaging comprises:

a central curved surface joining the first and second lip members and adapted to comate with the recess of the pin;

a first carriage recess located on a first side of the central curved surface and adapted to receive the outer shoulder of the pin; and a second carriage recess located on a second side of the central curved surface opposite the first side and adapted to receive the inner shoulder of the pin, whereby the pin is prevented from moving while it is located in the inserted position.

10. Apparatus, as claimed in claim 7, wherein the resilient means comprises a coil spring.

* * * * *